(12) United States Patent
Fege et al.

(10) Patent No.: US 12,049,244 B2
(45) Date of Patent: Jul. 30, 2024

(54) CONTROLLABLE TRACK CONDITIONING UNIT

(71) Applicant: Siemens Mobility GmbH, Munich (DE)

(72) Inventors: Alexander Fege, Augsburg (DE); Heiko Meyer, Munich (DE); Kilian Rossig, Munich (DE)

(73) Assignee: Siemens Mobility GmbH, Munich (DE)

( * ) Notice: Subject to any disclaimer, the term of this patent is extended or adjusted under 35 U.S.C. 154(b) by 926 days.

(21) Appl. No.: 17/056,091

(22) PCT Filed: Sep. 27, 2018

(86) PCT No.: PCT/EP2018/076315
§ 371 (c)(1),
(2) Date: Nov. 17, 2020

(87) PCT Pub. No.: WO2019/219223
PCT Pub. Date: Nov. 21, 2019

(65) Prior Publication Data
US 2021/0206405 A1 Jul. 8, 2021

(30) Foreign Application Priority Data
May 17, 2018 (DE) .................... 10 2018 207 751.7

(51) Int. Cl.
*B61C 15/10* (2006.01)
*B61K 9/08* (2006.01)
(Continued)

(52) U.S. Cl.
CPC ............ *B61C 15/10* (2013.01); *B61C 15/102* (2013.01); *B61C 15/105* (2013.01);
(Continued)

(58) Field of Classification Search
CPC .... B61L 15/0081; B61L 23/04; B61L 23/047; B61C 15/10–107; B61K 9/08;
(Continued)

(56) References Cited

U.S. PATENT DOCUMENTS

| | | | | |
|---|---|---|---|---|
| 3,380,394 A | * | 4/1968 | Fornerod | E01B 35/00 104/7.2 |
| 5,100,175 A | * | 3/1992 | Swallow | B60S 1/68 280/727 |
| 5,477,941 A | * | 12/1995 | Kumar | B61C 15/107 184/6 |
| 6,588,808 B1 | * | 7/2003 | Sheppard | B61C 15/102 291/1 |

(Continued)

FOREIGN PATENT DOCUMENTS

| | | |
|---|---|---|
| CN | 104816586 A | 8/2015 |
| CN | 105196796 A | 12/2015 |

(Continued)

*Primary Examiner* — S. Joseph Morano
*Assistant Examiner* — James William Jones
(74) *Attorney, Agent, or Firm* — Laurence A. Greenberg; Werner H. Stemer; Ralph E. Locher (57) ABSTRACT

An adjustment device for a track conditioning unit has a measuring unit for determining a lateral offset of a rail, travelled on by a rail vehicle, relative to an effective range of a track conditioning unit or a measuring unit for determining the relative position of a bogie with respect to the rail car body. The adjustment device contains a determining unit for determining an actuation command for an actuation unit in accordance with the determined lateral offset between the effective range of the track conditioning unit and the rail. Part of the adjustment device for the track conditioning unit is also an actuation unit for actuating an actuator unit of the track-conditioning unit with an adjustment command which is generated on the basis of the actuation command. The actuator unit adjusts an effective range of the track conditioning unit on the basis of the adjustment command.

11 Claims, 7 Drawing Sheets

(51) Int. Cl.
*B61K 9/12* (2006.01)
*B61L 15/00* (2006.01)
*B61L 23/04* (2006.01)
*B60B 17/00* (2006.01)
*B60B 39/02* (2006.01)
*B60B 39/04* (2006.01)
*B60B 39/10* (2006.01)

(52) U.S. Cl.
CPC .............. *B61C 15/107* (2013.01); *B61K 9/08* (2013.01); *B61K 9/12* (2013.01); *B61L 15/0081* (2013.01); *B61L 23/042* (2013.01); *B61L 23/047* (2013.01); *B60B 17/00* (2013.01); *B60B 39/025* (2013.01); *B60B 39/04* (2013.01); *B60B 39/10* (2013.01); *B60Y 2200/30* (2013.01)

(58) Field of Classification Search
CPC ......... B61K 9/12; B60B 17/00; B60B 39/025; B60B 39/04; B60B 39/10; B60Y 2200/30
USPC ................. 246/192 R; 291/1, 46, 47
See application file for complete search history.

(56) References Cited

U.S. PATENT DOCUMENTS

| | | | |
|---|---|---|---|
| 10,195,898 B2* | 2/2019 | Toros | B60B 39/025 |
| 2012/0061367 A1* | 3/2012 | Wolff | B61C 15/08 |
| | | | 219/202 |
| 2013/0206862 A1 | 8/2013 | Worden et al. | |
| 2014/0151460 A1* | 6/2014 | Noffsinger | B61C 15/10 |
| | | | 239/69 |
| 2015/0051759 A1* | 2/2015 | Worden | B61C 17/12 |
| | | | 701/19 |
| 2018/0119376 A1* | 5/2018 | Klima | E01H 8/105 |
| 2019/0322294 A1* | 10/2019 | Worden | B61C 17/12 |

FOREIGN PATENT DOCUMENTS

| | | | |
|---|---|---|---|
| CN | 107031667 A | 8/2017 | |
| WO | 2013034698 A2 | 3/2013 | |
| WO | 2015044245 A1 | 4/2015 | |
| WO | 2015044246 A1 | 4/2015 | |
| WO | 2017070677 A1 | 4/2017 | |
| WO | WO-2017070677 A1 * | 4/2017 | ........... B05B 15/652 |

* cited by examiner

CONTROLLABLE TRACK CONDITIONING UNIT

BACKGROUND OF THE INVENTION

Field of the Invention

The invention relates to an adjustment installation for a track conditioning unit. The invention furthermore relates to a rail vehicle. The invention moreover relates to a method for adjusting a track conditioning unit.

Figure 1:
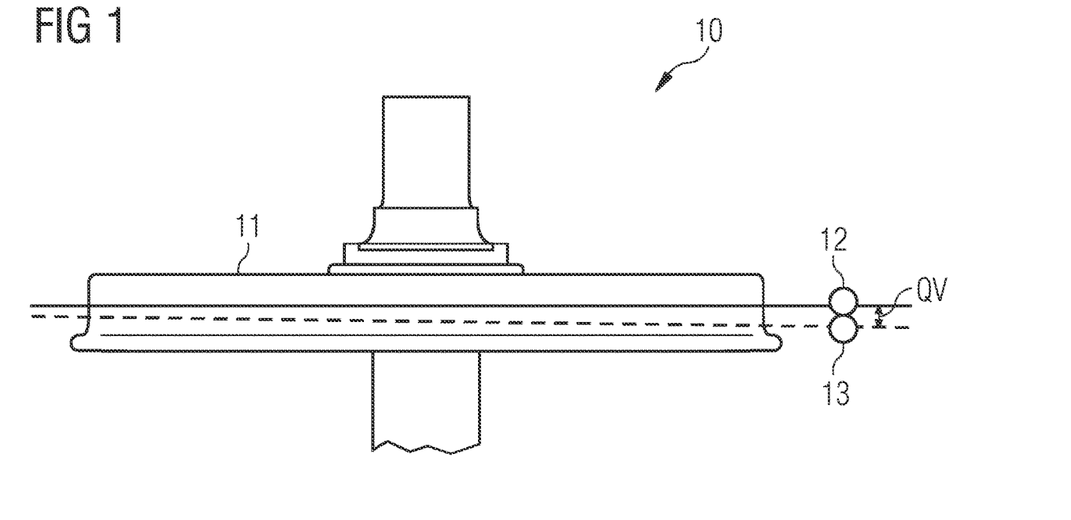
FIG. 1 shows a plan view of a wheel of a rail vehicle and a schematic illustration of a transverse offset of an effective range of a track conditioning unit.

The contact and thus also the coefficient of adhesion between the wheel of a rail vehicle and the traveled rails is heavily influenced by external conditions such as, for example wet, dirt or similar. A track conditioning unit is used for increasing a coefficient of adhesion between a wheel of a rail vehicle and the traveled rails. The increase in the coefficient of adhesion can be achieved by mechanical cleaning or by applying one auxiliary medium or a plurality of auxiliary media such as, for example sand, water or air to the rails, or by a combination of the two methods. The track conditioning unit can be disposed on the car body or on the bogie of the respective rail vehicle and in a punctiform manner acts directly on the traveled rail. The profile of a permanent way such as, for example the presence of curves or a widening of the track groove, and different states of travel can lead to a non-ideal positioning of the track conditioning unit by virtue of the latter being offset transversely in relation to the rails. An example of such a misalignment is shown in FIG. 1. The amount of the value of the transverse offset is a function of the installed position of the track conditioning unit on the car body or on the bogie of a rail vehicle. As a result of the transverse offset it can arise that the rail is no longer covered by the effective range of the track conditioning unit since the track conditioning unit works only in a punctiform manner. That is to say that the track conditioning unit by virtue of the transverse deflection in relation to the rails can no longer act in an optimal manner or may no longer work at all since the effective range lies beside the rail. The effect increasing the coefficient of adhesion is reduced or is entirely lost on account thereof.

If the track conditioning unit in terms of the longitudinal direction of the vehicle is disposed proximal to the point of rotation of the bogie, the transverse offset in track curves can be reduced. However, a disposal of the track conditioning unit proximal to the point of rotation does not result in any positive effect in the case of a widening of the track groove. The reduced effect of the track conditioning unit can in many cases also be compensated for by delivering a larger quantity of auxiliary media such as, for example sand, water or air.

SUMMARY OF THE INVENTION

There is thus the object of specifying a device and a method by way of which an improved coefficient of adhesion of a rail vehicle can be achieved.

This object is achieved by an adjustment installation for a track conditioning unit as claimed in the independent adjustment installation patent claim, by a rail vehicle as claimed in the independent rail vehicle patent claim, and by a method for adjusting a track conditioning unit as claimed in the independent method patent claim.

The adjustment installation for a track conditioning unit according to the invention has at least one measuring unit for determining a relative transverse offset of a rail traveled by the rail vehicle in relation to an effective range of a track conditioning unit of the rail vehicle. Such an effective range comprises the area portion on which the track conditioning unit acts. For example, an auxiliary medium of the track conditioning unit herein impacts an area portion which represents the effective range of the track conditioning unit. Alternatively, the adjustment installation for a track conditioning unit according to the invention has at least one measuring unit for determining the relative position between at least one bogie and a car body of the rail vehicle. Alternatively or additionally, a transverse offset can also be determined indirectly by measuring a rotation of a bogie. A determination unit for determining an actuation command for an actuation unit as a function of the determined transverse offset and the area size of the effective range of the track conditioning unit is also part of the adjustment installation for a track conditioning unit according to the invention. The actuation command takes place in such a manner that the active effective range, that is to say the interface of the effective range and the rail face, is increased by an adjustment procedure so as to herewith improve the effectiveness of the track conditioning unit.

Alternatively, the adjustment installation for a track conditioning unit according to the invention also has a determination unit for determining an actuation command as a function of the relative position between the bogie and the car body. In this variant the actuation takes place in a manner based directly on the position of the running gear. The respective correlation between control variables and the position of the running gear can be obtained either empirically or by a calculation by way of a formula.

The area size of the effective range of the track conditioning unit and/or the shape of said face and the width of the running surface of the traveled rail in these two variants can be taken into account at least indirectly so as to determine a current and a desired coefficient of adhesion as a function of a current interface, or an interface present upon adjustment, respectively, between the effective range and the running surface of the traveled rail.

The adjustment installation for a track conditioning unit according to the invention moreover has the actuation unit for actuating an actuator unit of the track conditioning unit using an adjustment command based on the actuation command. Moreover, the adjustment installation for a track conditioning unit comprises the actuator unit for adjusting an effective range of the track conditioning unit based on the adjustment command. An improved effect of the track conditioning unit is advantageously achieved in the event of a variation of the routing of the rail such as, for example in track curves or in the event of a widened gauge. An enhanced braking action as well as an improved traction behavior of a rail vehicle are associated with a higher coefficient of adhesion. Auxiliary media such as, for example sand, water, or air, can be saved in that the effect of the track conditioning unit is improved. Installations for generating and storing the auxiliary media can consequently be of smaller dimensions, and the complexity and the costs for achieving an improved adhesion between the rail vehicle wheels and the rails can thus be reduced.

Alternatively, the adjustment installation for a track conditioning unit according to the invention can have a mechanical transmission installation which converts a relative movement between a car body and a bogie of a rail vehicle to an adjusting movement for adjusting an effective range of the track conditioning unit.

The adjustment installation for a track conditioning unit according to the invention can moreover have an actuator unit for adjusting an effective range of the track conditioning unit based on the adjusting movement generated by the mechanical transmission installation.

Complex electronics for adjusting the track conditioning unit can advantageously be dispensed with in the case of these variants. The assembly is thus simpler, more robust, and less prone to malfunctioning.

The rail vehicle according to the invention has a track conditioning unit and the adjustment installation for a track conditioning unit according to the invention for adapting the effective range of the track conditioning unit to a transverse offset of the rails traveled by the rail vehicle.

The rail vehicle according to the invention shares the advantages of the adjustment installation for a track conditioning unit according to the invention.

In the method according to the invention for adjusting a track conditioning unit, a relative transverse offset of a rail traveled by the rail vehicle in relation to an effective range of a track conditioning unit of the rail vehicle is determined. Alternatively, a relative position between at least one bogie and a car body of the rail vehicle is determined.

An actuation command for controlling an actuation unit as a function of the determined transverse offset or the relative position of the bogie in relation to the car body and the area size of the effective range of the track conditioning unit is furthermore generated, and the generated actuation command is transmitted to the actuation unit.

An adjustment command based on the actuating command is generated by the actuation unit and transmitted from the actuation unit to an actuator unit. Finally, an effective range of the track conditioning unit is adapted by an adjusting movement of the actuator unit, said adjusting movement taking place based on the adjustment command. The method according to the invention for adjusting a track conditioning unit shares the advantages of the adjustment installation for a track conditioning unit according to the invention.

The dependent claims as well as the description hereunder contain in each case particularly advantageous design embodiments and refinements of the invention. The claims of one claim category herein can in particular also be refined in a manner analogous to the dependent claims of another claim category and the parts of the description pertaining to the latter. Moreover, the various features of different exemplary embodiments and claims in the context of the invention can also be combined so as to form new exemplary embodiments.

In one preferred design embodiment of the adjustment installation for a track conditioning unit according to the invention the determination unit is specified for determining the actuation command in such a manner that an effect increasing the coefficient of adhesion is achieved. The magnitude of the improved coefficient of adhesion is a function of the effective face of the effective range, or the size of the active effective range, respectively. A larger active effective range moreover permits a more economical use of auxiliary media in order to achieve an improved coefficient of adhesion.

In one variant of the adjustment installation for a track conditioning unit according to the invention the determination unit is specified for determining the actuation command in such a manner that an optimal value of an effect increasing the coefficient of adhesion is achieved. An optimal effect increasing the coefficient of adhesion is achieved in the case of a maximum active effective range and an optimal use of auxiliary media. A maximum braking action and an optimal traction behavior of a rail vehicle are advantageously achieved in this variant.

In one design embodiment of the adjustment installation for a track conditioning unit according to the invention the determination unit is specified for determining the actuation command in such a manner that a predetermined minimum value of a size of an interface between the effective range and the rail face, that is to say an active effective range, is achieved. As has already been mentioned, an improved coefficient of adhesion in the case of a predefined quantity of auxiliary media used can be achieved by varying the size of the active effective range.

In one special variant of the adjustment installation for a track conditioning unit according to the invention the determination unit is specified for determining the actuation command in such a manner that a maximum interface between the effective range and the rail face is achieved. As has already been mentioned, a maximum coefficient of adhesion is achieved in the case of a maximum active effective range and a predefined quantity of auxiliary media used, this contributing toward an optimal braking behavior and a maximum traction of the rail vehicle.

The actuator unit of the adjustment installation for a track conditioning unit according to the invention can be specified for adjusting a position and/or orientation of the track conditioning unit so as to adjust the effective range of the track conditioning unit. A variation of the position and/or the orientation of the track conditioning unit is also achieved conjointly with a variation of the position of the effective range of the track conditioning unit. The area of the active effective range can be increased in this way, on account of which an improved coefficient of adhesion of a rail vehicle can be achieved with a constant quantity of the effective medium being used.

In one design embodiment of the adjustment installation for a track conditioning unit according to the invention the measuring unit per rail has at least one sensor unit which is specified for recording sensor data of a rail traveled by the rail vehicle and for determining the transverse offset between the track conditioning unit and the rail based on the sensor data. A current position and area of an active effective range can be detected and monitored with the aid of the sensor unit. A track typically has two rails which lie so as to be mutually parallel. At least one sensor unit per rail is used in this variant in order to be able to take into account individual deviations or transverse offsets, respectively, of the two rails.

As has already been mentioned, there is also the indirect method as an alternative to the direct method. In said indirect method it is not the transverse displacement of the track conditioning unit in relation to the rail that is measured and utilized as an actuation command for the actuation unit, but the relative position of a bogie or both bogies in relation to the car body is measured with the aid of sensor units, and the relative position of the track conditioning unit in relation to the rail is thus indirectly determined. The following principles of measurement can be fundamentally used for both types of determining the transverse offset.

For example, the technical function of the sensor units used can be based on one of the following principles of measurement:

optical;
inductive;
ultrasonic;
capacitive.

For example, an optical sensor unit can record image data which can be interpreted with the aid of image processing. Inductive and capacitive sensors, for example, can function as distance sensors, wherein the fact that rails are made from ferrous metal material and therefore are electrically conducting can be utilized. A type of rough image of the rail region can likewise be established using ultrasonic waves.

The determination unit of the adjustment installation for a track conditioning unit according to the invention can comprise a switching logic having at least one suitable switching threshold value which indicates that an optimal or a pre-determined effective range on the rails can no longer be achieved. The switching threshold value herein is based on the geometric arrangement of the track conditioning unit and on a predetermined minimum size of the effective range.

In one variant of the adjustment installation for a track conditioning unit the actuator is specified for rotating the effective direction of the track conditioning unit about a longitudinal axis which runs so as to be parallel with the profile of the rails. The position of the effective range can be adapted to a changed relative track position by rotating the effective direction of the track conditioning unit so as to increase the area of the active effective range and to increase the coefficient of adhesion between the rail and the rail vehicle.

The actuator can also be configured as a translatory actuator and be specified for displacing the effective range of the track conditioning unit in the direction transverse to the travelling direction. The position of the effective range by way of this method can advantageously also be adapted to a changed relative track position so as to increase the area of the active effective range and increase the coefficient of adhesion between the rail and the rail vehicle.

A combination of the two preceding design embodiments is also possible. That is to say that a translatory movement and a rotary movement can be combined with one another in order for the track conditioning unit to be adjusted.

Alternatively, the actuator can be specified for displacing the effective range of the adjustment installation for a track conditioning unit in that one of a plurality of exit openings for auxiliary media is opened, the effective range of said exit opening being the most suitable for the determined transverse offset. The position of the effective range by way of this method can advantageously also be adapted to a changed relative track position so as to increase the area of the active effective range and to increase the coefficient of adhesion between the rail and the rail vehicle.

The invention will be explained once again in more detail hereunder by means of exemplary embodiments with reference to the appended figures.

DETAILED DESCRIPTION OF THE INVENTION

A plan view 10 of a wheel 11 of a rail vehicle (not shown) and a schematic illustration of a transverse offset QV of an effective range of a track conditioning unit are illustrated in in FIG. 1.

For comparison, a solid line of an actual direction of the wheel 11, which is aligned tangentially to the arc of a track on which the wheel 11 rolls, and a dashed line of an arcuate track profile having a desired effective range 13 are plotted in the rolling direction of the wheel 11. The actual effective range 12 of the track conditioning unit thus lies on the solid line and no longer impacts the arcuate track as well as the desired effective range 13 such that there is no longer any action in terms of an effect increasing the coefficient of adhesion. The spacing QV in the transverse direction between the actual effective range 12 and the track arc, or the desired effective range 13 situated on the track arc, respectively, is referred to as the transverse offset QV.

Figure 2:
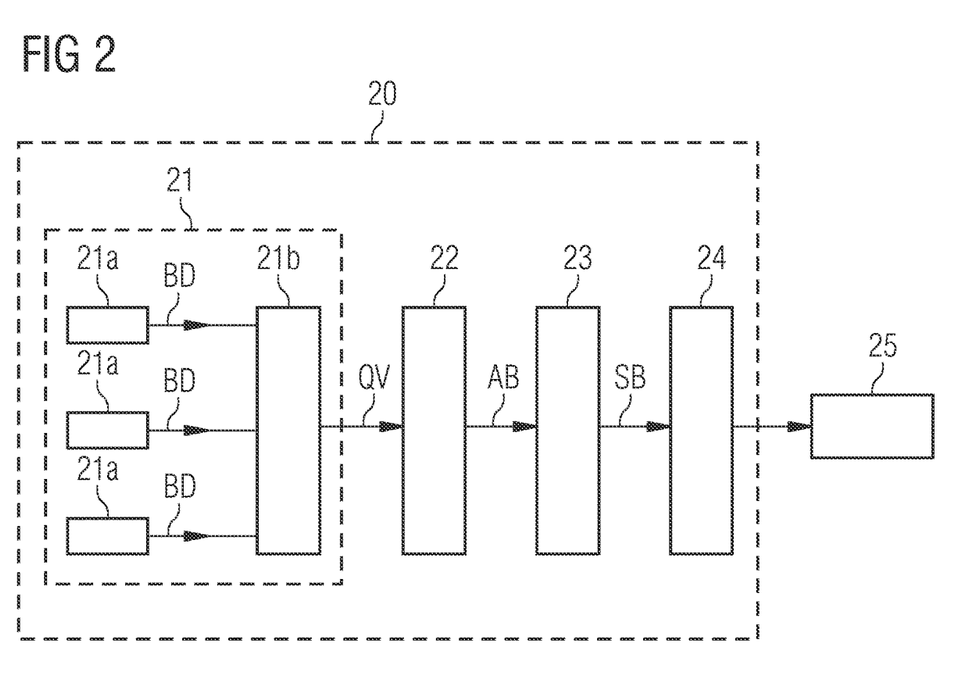
FIG. 2 shows a schematic illustration of an adjustment installation for a track conditioning unit according to one exemplary embodiment of the invention.

A schematic illustration of an adjustment installation 20 for a track conditioning unit according to one exemplary embodiment of the invention is shown in FIG. 2. The adjustment installation 20 for a track conditioning unit comprises a measuring unit 21. The measuring unit 21 comprises three sensor units 21a which in this specific exemplary embodiment comprise optical cameras by way of which image data BD of a rail region which is to be traveled by a rail vehicle on which the adjustment installation 20 for a track conditioning unit is disposed is recorded. The image data BD, in terms of the relative position of the rails in the image in relation to a predetermined position of an effective range, is evaluated in a rail detection unit 21b which is likewise part of the measuring unit 21. A transverse offset QV between the effective range and a rail position determined by the cameras 21a is determined from these positions. The information pertaining to the transverse offset QV is transmitted to a determination unit 22 which, based on the transverse offset QV and the known area size of the effective range of the track conditioning unit, determines whether a correction of the position and/or alignment of the track conditioning unit 25 is required in order to achieve a sufficient improvement of the coefficient of adhesion. In the case of a correction being required, the determination unit 22, based on a calculated correction, determines an actuation command AB which is transmitted to an actuation unit 23. The actuation unit 23, with the aid of an adjustment command SB which is based on the received actuation command AB, controls an actuator unit 24 which is likewise part of the adjustment installation 20 for a track conditioning unit. The actuator unit 24 carries out the adjustment command SB and adjusts a position and/or orientation of a track conditioning unit 25 which is actuated by the actuator unit 24 so as to adapt the effective range of said track conditioning unit to a current transverse offset between the rail and the previous effective range.

Figure 3:
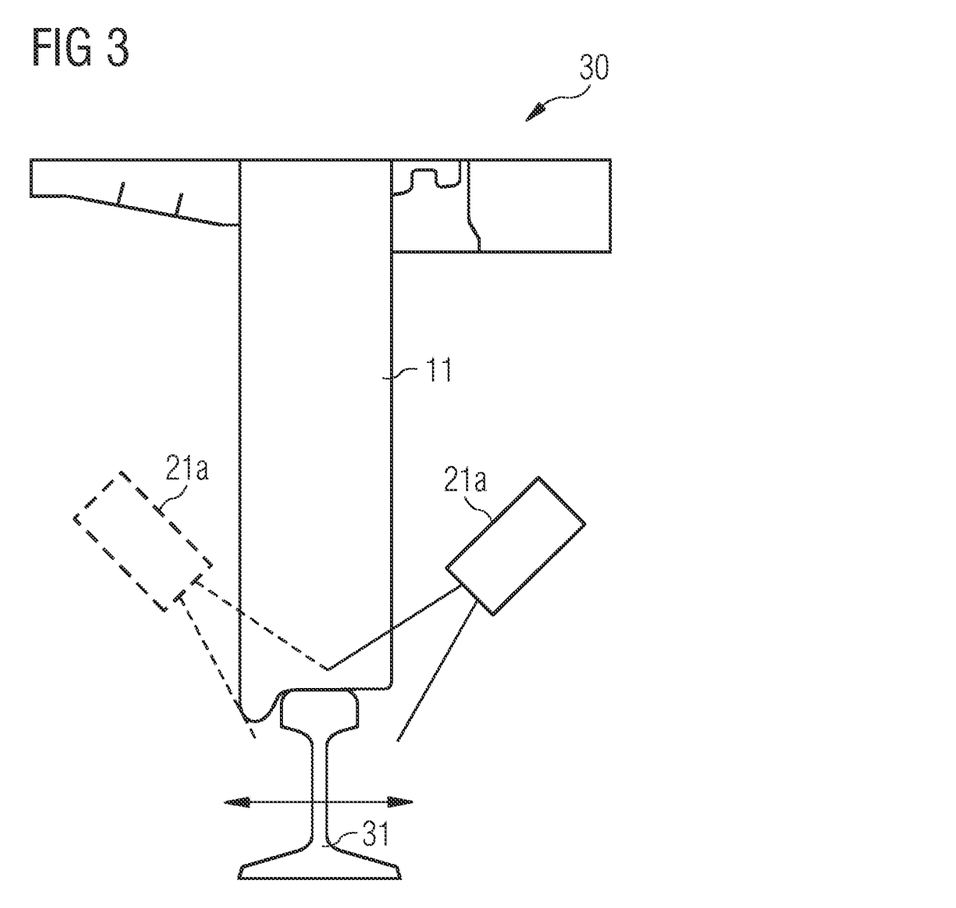
FIG. 3 shows a schematic illustration of detecting rails with the aid of sensors.

A cross-sectional view 30 in which the detection of a rail position is visualized with the aid of a camera 21a (plotted with solid lines on the right side) is shown in FIG. 3. The camera 21a can be mounted on the right side ahead of a wheel 11 of a rail vehicle as well as be mounted on the left side ahead of the wheel 11 of the rail vehicle (plotted with dashed lines). The camera 21a records image data from a rail 31 traveled by the rail vehicle. An evaluation of the recorded image data and the knowledge of the vertical distance between the camera 21a and the rail enables an accurate determination of the position of the rail 31 and thus a transverse offset in the direction of the arrow to be determined. The determination of the transverse offset takes place permanently by way of continually recorded images and evaluations.

Figure 4:
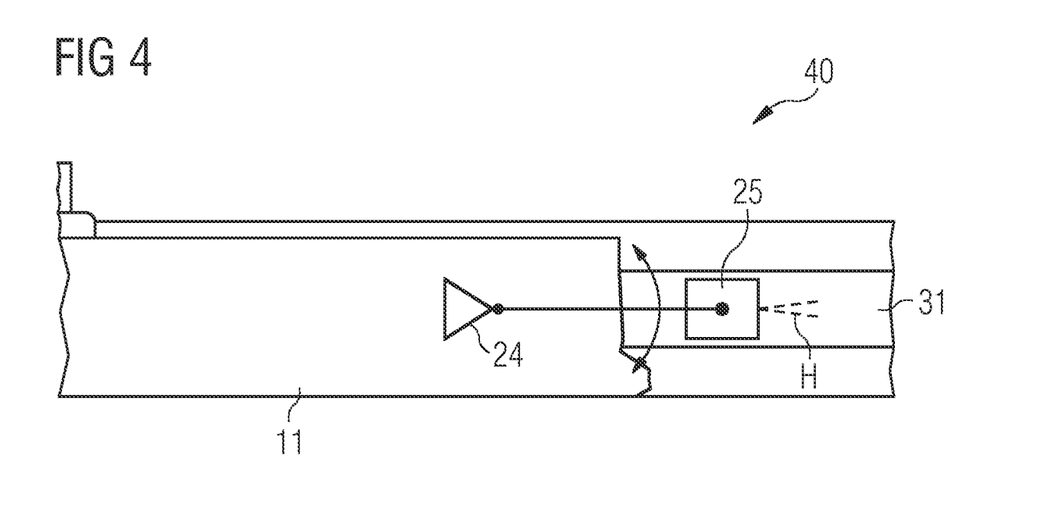
FIG. 4 shows a schematic plan view of a pivotable track conditioning unit.

A plan view 40 of a pivotable track conditioning unit 25 is shown in FIG. 4. The track conditioning unit 25 is mounted on a rail vehicle (not shown) so as to be ahead of a wheel 11 of the rail vehicle. The track conditioning unit 25 is mechanically connected to an actuator unit 24 and by the actuator unit 24 can be pivoted about a longitudinal axis which runs in the longitudinal direction of the rail vehicle. An offset in the transverse direction between the rails and the track conditioning unit 25 can thus be compensated for. Instead of being vertical, the effective direction is slightly diagonal such that the effective range of the track conditioning unit 25 continues to lie on the upper side of the rail 31 even when there is a transverse offset between the track conditioning unit 25 and that the rail 31. In the exemplary embodiment shown in FIG. 4 an auxiliary medium H, or a combination of different auxiliary media H, for example sand, water or air, is placed onto the rail 31 by the adjusted track conditioning unit 25.

Figure 5:
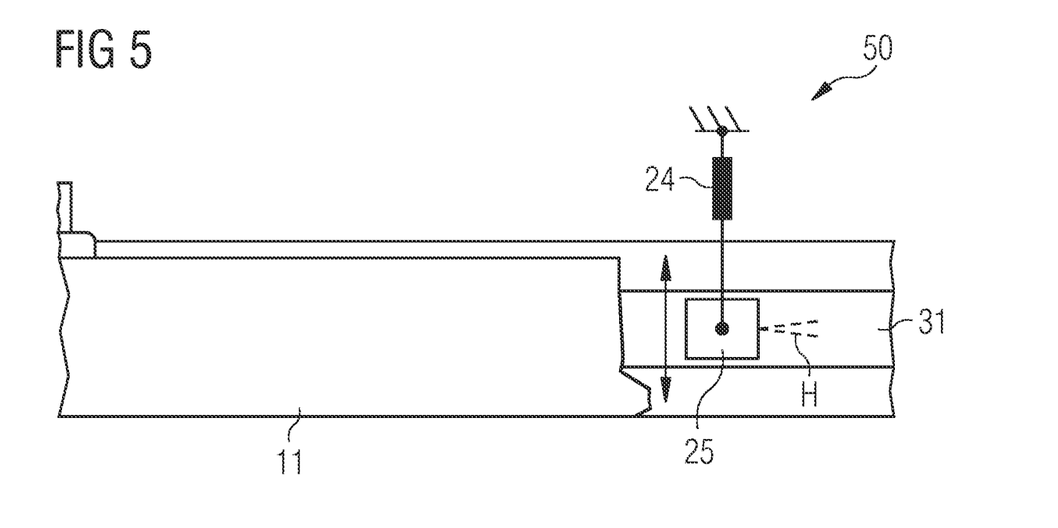
FIG. 5 shows a schematic plan view of a displaceable track conditioning unit.

A displaceable track conditioning unit 25 is shown in a schematic plan view 50 in FIG. 5. In contrast to FIG. 4, the track conditioning unit 25 is not pivotable but in terms of the position thereof is displaceable in the transverse direction. To this end, said track conditioning unit by a laterally positioned actuator 24 is displaced in the transverse direction, that is to say in the direction of the arrow, so as to equalize an offset between the track conditioning unit 25 and the track 31. An auxiliary medium H is also applied onto a rail 31 ahead of a wheel 11 of a rail vehicle (not shown) by the track conditioning unit 25 also in the exemplary embodiment shown in FIG. 5.

Figure 6:
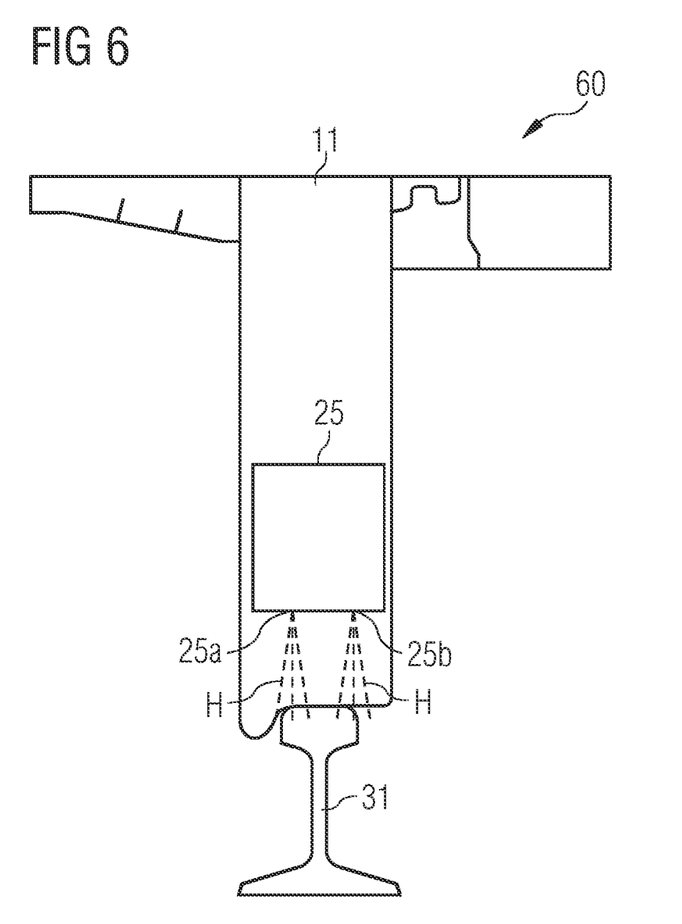
FIG. 6 shows a schematic front view of a track conditioning unit having a plurality of switchable outlets for auxiliary media.

A front view 60 of a track conditioning unit 25 is shown in FIG. 6. The track conditioning unit 25 is positioned ahead of a wheel 11 of a rail vehicle and has a plurality of switchable outlets 25a, 25b for auxiliary media H, for example sand, water or air. The track conditioning unit 25 is positioned ahead of a wheel 11 of a rail vehicle. If the rail 31 on which the rail vehicle rolls, when viewed from the front, that is to say from the perspective shown, in relation to the track conditioning unit 25 now has an offset toward the left, the left outlet 25a is opened and the right outlet 25b is closed. The left outlet 25a in this instance is then approximately vertically above the transversely offset rail 31. In contrast, if the rail 31 in relation to the track conditioning unit 25 has an offset toward the right, the right outlet 25b is opened and the left outlet 25a is closed. If there is no offset, any arbitrary outlet 25a, 25b can optionally be opened, or both outlets 25a, 25b can be opened.

Figure 7:
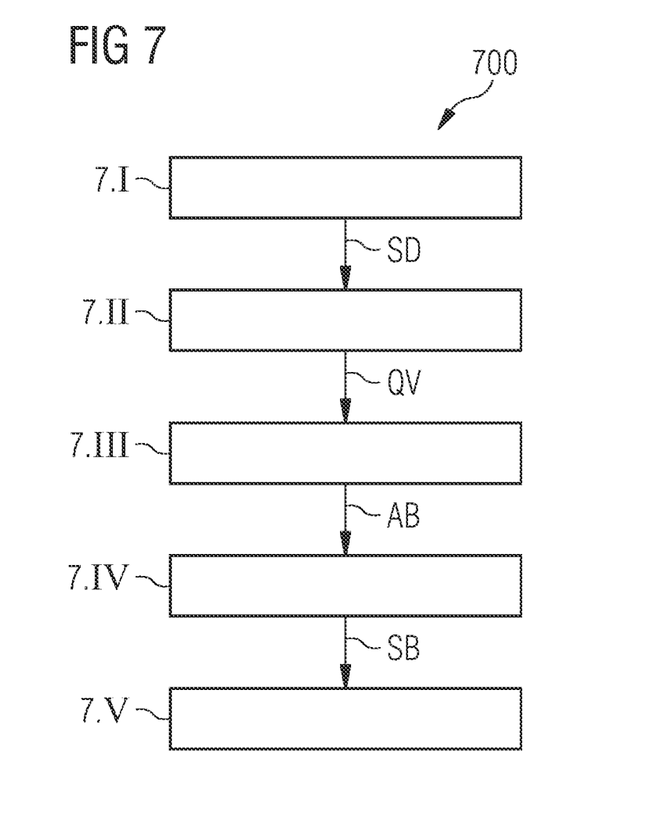
FIG. 7 shows a flow chart which visualizes a method for adjusting a track conditioning unit according to one exemplary embodiment of the invention.

A flow chart which visualizes a method for adjusting a track conditioning unit of a rail vehicle is shown in FIG. 7. Sensor data SD is first continuously recorded with the aid of sensor units in step 7.I. In step 7.II a relative transverse offset QV of a rail traveled by the rail vehicle in relation to an effective range of a track conditioning unit of the rail vehicle is determined by means of the sensor data SD. The determination of the transverse offset can take place directly, that is to say by measuring a position of the rail with the aid of sensor units, or else indirectly by determining a relative position between the car body and the bogie with the aid of sensors. An actuation command AB for an actuation unit in step 7.III is furthermore determined by means of the transverse offset QV or alternatively as a function of the relative position between a bogie and a car body. An adjustment command SB by way of which a movement of an actuator is controlled is generated based on the actuation command AB by the actuation unit in step 7.IV. The actuator in step 7.V moves the track conditioning unit according to the obtained adjustment command SB to a position which is selected in such a manner that the effective range of the track conditioning unit coincides with the position of a rail, or the running surface of the latter, respectively.

Figure 8:
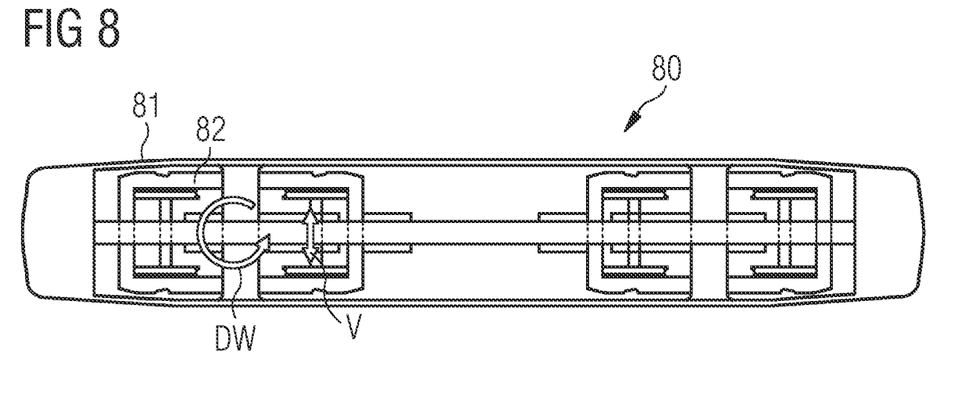
FIG. 8 shows a schematic plan view of a rail vehicle.

FIG. 8 shows a schematic plan view 80 of a rail vehicle. The rail vehicle has a car body 81 on which two bogies 82 are mounted. When the rail vehicle travels into a curve this results in a relative rotation of the bogie 82 by way of a characteristic rotation angle DW (indicated by an arrow running in the circumferential direction of a circle) in relation to the car body 81. A relative transverse offset V (symbolized by an arrow in the transverse direction) of the wheels of the bogie in relation to the car body 81 also results herein. The rotation angle DW or the transverse offset V of the wheels of the bogie 82 can be detected with the aid of sensors, for example. When at least one of these two values DW, V is known, the relative transverse offset QV between a rail traveled by the rail vehicle in relation to an effective range of a track conditioning unit of the rail vehicle can be calculated.

Figure 9:
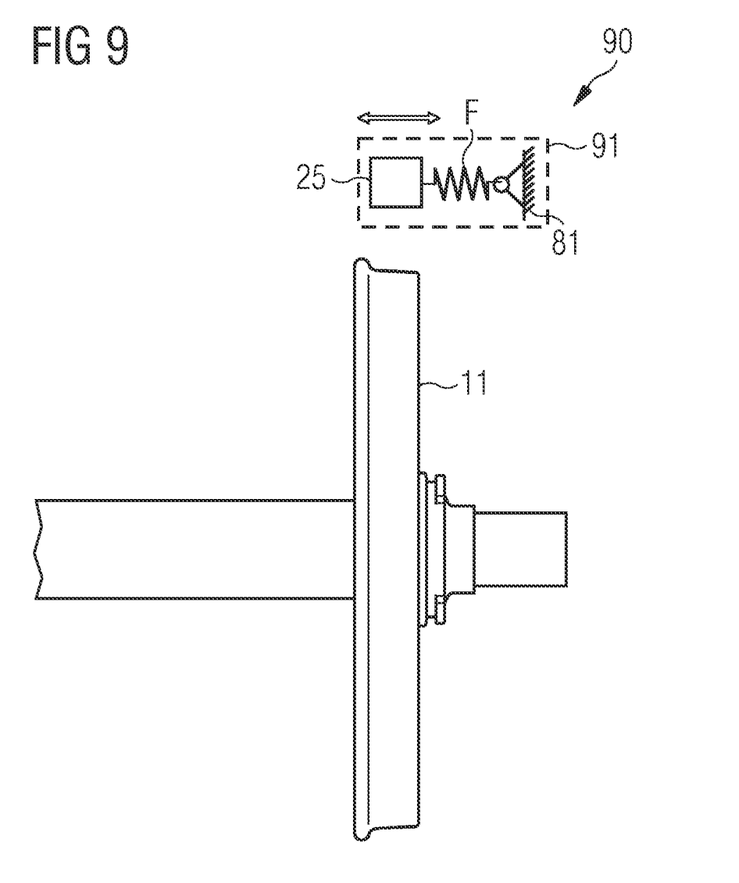
FIG. 9 shows an adjustment installation for a track conditioning unit having a mechanical transmission installation according to one exemplary embodiment of the invention.

A plan view 90 of an adjustment installation 91 for a track conditioning unit having a mechanical transmission installation F according to one exemplary embodiment of the invention is visualized in FIG. 9. The relative deflection of the car body in relation to the bogie is utilized as a mechanical distance control variable for a positive tracking of a track conditioning unit 25 with the aid of the mechanical transmission installation F which is illustrated as a spring element in FIG. 9. In the exemplary embodiment shown in FIG. 9, the track conditioning unit 25 is fastened to the bogie, and the mechanical transmission installation F is fastened to the car body 81. Alternatively (not shown), the track conditioning unit can also be fastened to the car body; a fastening point on the bogie is in this instance chosen for the mechanical transmission installation. The mechanism of the mechanical transmission installation can comprise, for example, levers, springs, joints, or a combination of said elements.

It is finally pointed out once again that the methods and devices described above are merely preferred exemplary embodiments of the invention and that the invention can be varied by the person skilled in the art without departing from the scope of the invention as long as said scope is predefined by the claims. For the sake of completeness, it is also pointed out that the use of the indefinite article "a" does not preclude that the respective features may also be present in multiple. Likewise, the term "unit" also does not exclude that the latter is composed of a plurality of components which optionally may also be spatially distributed.

The invention claimed is:

1. An adjustment installation for a track conditioning unit, the adjustment installation comprising:
  at least one sensor providing signals for:
    determining a relative transverse offset of a rail traveled by a rail vehicle in relation to an effective range of the track conditioning unit of the rail vehicle, or
    determining a relative position of a bogie and of a car body of the rail vehicle;
  a determination unit configured for determining an actuation command in dependence on:
    the relative transverse offset determined between the effective range of the track conditioning unit and the rail, or
    the relative position of the bogie in relation to the car body of the rail vehicle;
  an actuator being actuated based on the actuation command;
  said actuator configured for adjusting the effective range of the track conditioning unit based on the actuation command, said actuator configured for displacing the effective range of the adjustment installation for the track conditioning unit by opening one of a plurality of exit openings for an auxiliary media, wherein the one of the plurality of exit openings that is opened has an effective range that is most suitable for the relative transverse offset that was determined, wherein the rail vehicle has a wheel and the plurality of exit openings are located adjacent the wheel of the rail vehicle.

2. The adjustment installation for the track conditioning unit according to claim 1, wherein said determination unit is configured for determining the actuation command in such a manner that an improved value of an effect increasing a coefficient of adhesion is achieved.

3. The adjustment installation for the track conditioning unit according to claim 1, wherein said determination unit is configured for determining the actuation command in such a manner that an optimal value of an effect increasing a coefficient of adhesion is achieved.

4. The adjustment installation for the track conditioning unit according to claim 1, wherein said determination unit is configured for determining the actuation command in such a manner that a predetermined minimum value of a size of an interface between the effective range and a rail face is achieved.

5. The adjustment installation for the track conditioning unit according to claim 4, wherein said determination unit is configured for determining the actuation command in such a manner that a maximum interface between the effective range and the rail face is achieved.

6. The adjustment installation for the track conditioning unit according to claim 1, wherein said at least one sensor includes:
  at least one sensor configured for recording sensor data of the rail traveled by the rail vehicle and for determining the relative transverse offset based on the sensor data; or
  at least one sensor configured for determining the relative position of the bogie in relation to the car body of the rail vehicle.

7. The adjustment installation for the track conditioning unit according to claim 6, wherein a technical function of said at least one sensor unit is based on one of the following principles of measurement:
  optical;
  inductive;
  ultrasonic; and
  capacitive.

8. The adjustment installation for the track conditioning unit according to claim 1, wherein said determination unit includes a switching logic having at least one suitable switching threshold value which indicates a departure from an optimal effective range on the rails, wherein the switching threshold value is based on a geometric configuration of the track conditioning unit and on a minimum size of the optimal effective range.

9. The adjustment installation for the track conditioning unit according to claim 1, further comprising a mechanical transmission installation which is configured for converting a relative movement between the car body and the bogie of the rail vehicle to an adjusting movement for adjusting the effective range of the track conditioning unit.

10. A rail vehicle, comprising:
  a track conditioning unit; and
  an adjustment installation according to claim 1, said adjustment installation for said track conditioning unit for adapting the effective range of said track conditioning unit to the relative transverse offset of rails traveled by the rail vehicle.

11. A method for adjusting a track conditioning unit of a rail vehicle, which comprises the steps of:
  performing one of:
    determining a relative transverse offset of a rail traveled by the rail vehicle in relation to an effective range of the track conditioning unit of the rail vehicle, or
    determining a relative position of a bogie in relation to a car body of the rail vehicle;
  determining an actuation command in dependence on the relative transverse offset or the relative position of the bogie in relation to the car body;
  generating an adjustment command based on the actuation command;
  adjusting an effective range of the track conditioning unit based on the adjustment command; and
  displacing the effective range of the adjustment installation for the track conditioning unit by opening one of a plurality of exit openings for an auxiliary media, wherein the one of the plurality of exit openings that is opened has an effective range that is most suitable for the relative transverse offset that was determined, wherein the rail vehicle has a wheel and the plurality of exit openings are located adjacent the wheel of the rail vehicle.

* * * * *